United States Patent [19]
Haroutel

[11] Patent Number: 5,069,299
[45] Date of Patent: Dec. 3, 1991

[54] LETTER SCALE AND FRANKING MACHINE INCORPORATING SAME

[75] Inventor: Jean-claude Haroutel, Orsay, France

[73] Assignee: Alcatel Satmam, Bagneux, France

[21] Appl. No.: 545,733

[22] Filed: Jun. 29, 1990

[30] Foreign Application Priority Data

Jun. 30, 1989 [FR] France .................. 89 08828

[51] Int. Cl.⁵ .................................. G01G 19/40
[52] U.S. Cl. ...................... 177/25.15; 177/DIG. 6
[58] Field of Search ............ 177/25.15, DIG. 6; 364/464.01–464.03

[56] References Cited

U.S. PATENT DOCUMENTS

| | | | |
|---|---|---|---|
| 3,692,988 | 9/1972 | Dlugos et al. | 177/25.15 X |
| 3,890,492 | 6/1975 | Manduley et al. | 364/464.02 |
| 4,047,006 | 2/1977 | Ellner | 177/25.15 |
| 4,051,913 | 9/1977 | Gudea | 177/25.15 |
| 4,102,420 | 7/1978 | Uyama et al. | 177/DIG. 6 |
| 4,102,421 | 7/1978 | Ozaki et al. | 177/DIG. 6 |
| 4,129,191 | 12/1978 | Kanning | 177/DIG. 6 |
| 4,131,946 | 12/1978 | Dlugos | 177/25.15 X |
| 4,152,579 | 5/1979 | Feinland | 177/DIG. 6 |
| 4,376,981 | 6/1983 | Check et al. | 177/25.15 |

FOREIGN PATENT DOCUMENTS 3634381 12/1988 Fed. Rep. of Germany .
2444932 7/1980 France .

Primary Examiner—George H. Miller, Jr.
Attorney, Agent, or Firm—Sughrue, Mion, Zinn, Macpeak & Seas

[57] ABSTRACT

A letter scale is adapted to be connected to a postal charge calculator unit and a printhead of a franking machine. It includes a horizontal plate adapted to receive a letter to be weighed and to move vertically due to the weight of the letter. A coding arm is mechanically coupled to the plate so as to move with it. This arm carries coding elements and fixed sensors face towards the arm to sense these coding elements as they move relative to the sensors due to movement of the arm. A processor unit connected to the sensors produces a measurement signal indicating one of a series of predetermined weight range within which the weight of the letter in question lies. A partly closed, flat, vertical casing houses at least the coding arm and the sensors. There is a vertical slot in an upper surface of the casing into which a letter is inserted to weigh it. The horizontal plate forms the bottom of this vertical slot. The letter scale constitutes a module connected and partly integrated into the franking machine. The processor unit is in the franking machine.

4 Claims, 2 Drawing Sheets

LETTER SCALE AND FRANKING MACHINE INCORPORATING SAME

BACKGROUND OF THE INVENTION

Field of the Invention

The present invention concerns a letter scale for use with a franking machine in which a calculator unit computes the amount that the franking machine must print on each letter. It is more particularly concerned with a letter scale for small franking machines for processing relatively small daily quantities of mail.

Description of the Prior Art

Existing franking machines are coupled to an electronic scale for accurately weighing each letter to be franked. The accurate weight measurement is transmitted to the calculator unit which is usually integrated into the electronic scale or into the franking machine to which the scale is connected. A keypad is used to enter into the calculator unit data defining, among other things, the destination country and the mailing method, so that the appropriate charge can be calculated. The amount calculated is displayed on a screen and transmitted to the printing head of the franking machine which prints it on the letter.

Electronic scales of this kind are relatively complex and costly; it is difficult to justify their use where the quantities of mail to be franked are small.

An object of the present invention is to provide a letter scale for use with a franking machine which is very simple in design, of compact overall dimensions and low cost, commensurate with other small items of office equipment.

SUMMARY OF THE INVENTION

In one aspect, the present invention consists in a letter scale adapted to be connected to a postal charge calculator unit and a printhead of a franking machine, comprising a horizontal plate adapted to receive a letter to be weighed and to move vertically due to the weight of said letter, a coding arm mechanically coupled to said plate so as to move with it, coding elements on said arm, fixed sensing means facing towards said arm to sense said coding elements as they move relative to said sensing means due to movement of said arm, a processor unit connected to said sensing means and adapted to produce a measurement signal indicating one of a series of predetermined weight ranges within which the weight of the letter in question lies, a partly closed, flat, vertical casing housing at least said coding arm and said sensing means, and a vertical slot in an upper surface of said casing into which a letter is inserted to weigh it, said horizontal plate forming the bottom of said vertical slot.

In another aspect, the present invention consists in a franking machine adapted for use with a letter scale adapted to be connected to a postal charge calculator unit and a printhead of said franking machine and comprising a horizontal plate adapted to receive a letter to be weighed and to move vertically due to the weight of said letter, a coding arm mechanically coupled to said plate so as to move with it, coding elements on said arm, fixed sensing means facing towards said arm to sense said coding elements as they move relative to said sensing means due to movement of said arm, a processor unit connected to said sensing means and adapted to produce a measurement signal indicating one of a series of predetermined weight ranges within which the weight of the letter in question lies, a partly closed, flat, vertical casing housing at least said coding arm and said sensing means, and a vertical slot in an upper surface of said casing into which a letter is inserted to weigh it, said horizontal plate forming the bottom of said vertical slot, in which said processor unit is outside said casing which as on a vertical surface parallel to said slot a connector for connecting said sensing means to said processor unit, said franking machine having a connector complementary to said connector on said letter scale on a vertical surface for direct connection of said letter scale to said franking machine, whereby said letter scale constitutes a module partially integrated into said franking machine.

Advantageously, the letter scale casing has a connector on one of its vertical surfaces and the franking machine has a complementary connector on one of its vertical surfaces, said letter scale when connected to the franking machine then constituting a module partially integrated into the franking machine.

Advantageously, only the sensing means and direction distinguishing means are accommodated with the coding arm in the letter scale casing and the processor unit is integrated into the franking machine with the postal charge calculator unit.

The characteristics and advantages of the present invention will emerge from the following description of one embodiment shown in the drawings.

Figure a schematic representation of the letter scale and the franking machine in accordance with the present invention.

DETAILED DESCRIPTION OF THE INVENTION

Figure 1:
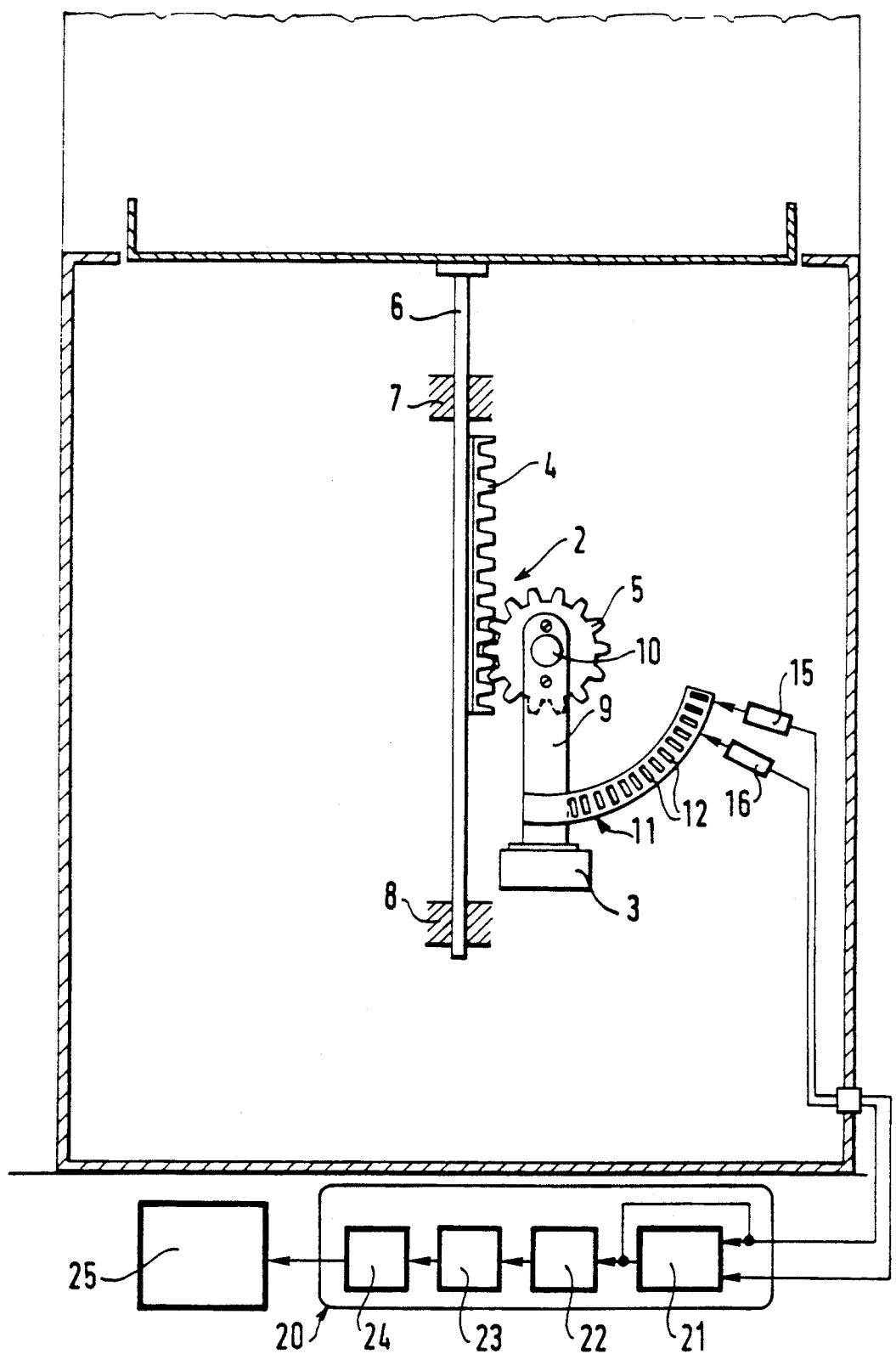
FIG. 1 is a schematic representation of a letter scale for use with a franking machine in accordance with the present invention coupled to printing means of the franking machine.

FIG. 1 shows a horizontal plate 1 of the letter scale upon which a letter is received. The plate moves vertically under the weight of the letter. A mechanism 2 with a counterweight 3 holds it in position with respect to a fixed horizontal shaft 10.

The mechanism 2 as shown comprises a rack 4 and a pinion 5 meshing with the rack. The rack is vertical; it is carried by a support arm 6. The upper end of the support arm 6 is fixed to the bottom of the central part of the plate 1. Its vertical movement is guided by two pairs of guides 7 and 8.

The counterweight 3 is mounted at the end of a support arm 9. The opposite end of the support arm 9 is fastened to the pinion 5. The pinion 5 meshes with the rack and is free to rotate on the shaft 10.

A coding arm 11 is fastened to the support arm 9. It is circular arc shape and concentric with the shaft 10. It extends from one side of the support arm 9 and carries a series of coding elements 12. The coding elements are regularly spaced narrow slots which define a bar code. The coding arm 11 is rotated about the shaft 10 by vertical displacement of the plate 1 and therefore of the rack 4 which rotates the pinion.

Two fixed photo-electric sensors 15 face towards the coding elements 12 to sense them when the coding arm 11 rotates. The two sensors 15 and 16 are mounted in quadrature facing the coding elements 12; they are at a specific distance from each other which is different from an integer number of coding element increments, one of them being aligned with one of the elements and the other being off-centre in the gap between two elements. The two quadrature sensors can sense the direction in which the elements move across them so as to count up the elements in one direction and to count down the elements in the other direction.

Both sensors are of the optical fork type with a photodiode on one side of the coding arm and a photosensor on the other side of the coding arm.

The mechanism 2 with the counterweight 3, the coding arm 10 and the two sensors 15 and 16 are accommodated in a letter scale casing 18. The two sensors 15 and 16 are coupled to a processor unit 20 which is preferably outside the casing 18. The processor unit 20 for the letter scale essentially comprises a circuit 21 for distinguishing between the directions of movement of the elements 12 and connected to the sensors 15 and 16, an up/down counting circuit 22 connected to one of the sensors (15, for example), a processor circuit 23 connected to the circuit 22 and a postal charge calculator unit 24 connected to the processor circuit 23. The postal charge calculator unit 24 is coupled to a printhead 25 of the franking machine.

The circuit 21 senses the direction of movement of the elements 12 from the edges of the sensor signals. The circuit 22 is set to count up and to count down alternately each time the direction of movement of the coding elements changes; it counts up and down the successive coding elements sensed by the detector 15. It supplies successive measurement values corresponding to the maximal and minimal amplitudes of the oscillations of the plate 1 as each letter is received on the plate. The processor circuit 23 receives the successive maximal and minimal values and integrates the first values received to produce a control signal. The control signal is used to select the weight range of the letter concerned from various predefined weight ranges. This selected range constitutes the measurement signal used by the postal charge calculator unit 24 to establish the corresponding amount. The various weight ranges are defined in the processor circuit 23 or in the postal charge calculator unit. The weight ranges are 0-20 g, 20-50 g and 50-100 g, for example. The weight ranges can equally well be defined selectively in units of 5 g. The amount calculated is transmitted to the printhead 25 so that the letter can be franked by the machine.

Figure 2:
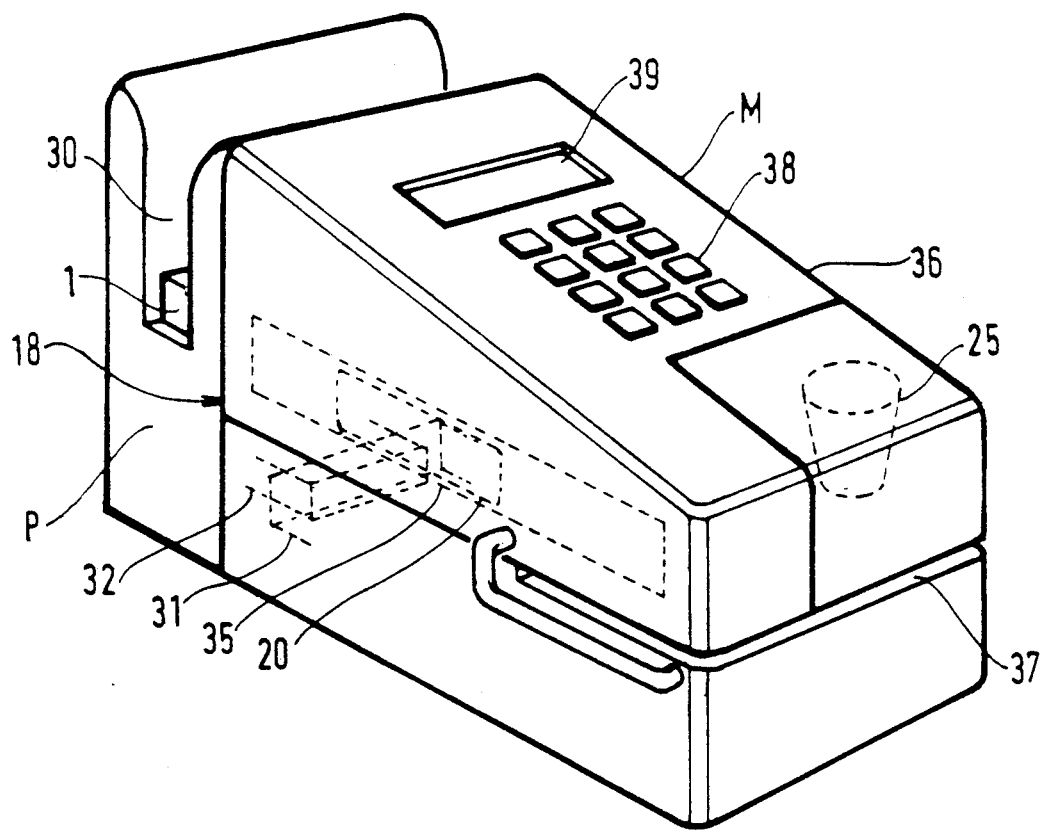

FIG. 2 is a schematic representation of the franking machine M with this letter scale P. The letter scale constitutes a module that is partially integrated into the machine M. It lies against the rear surface of the machine, as seen by the user, and is connected to the machine.

The letter scale casing 18 is a flat vertical casing with one of its larger vertical surfaces, referred to as the front surface, placed against the rear surface of the machine. The casing 18 incorporates a vertical slot 30 in its upper surface into which the letter is placed. The plate 1 receiving the letter constitutes the bottom of the slot, substantially half way down the height of the letter scale P.

The machine has a first connector 31 on its rear surface and the letter scale has a second, complementary connector 32 on its front surface. The two connectors are at substantially the same height relative to the base of the machine and that of the letter scale. Referring to FIG. 1, the connector 32 is preferably connected to the two sensors 15 and 16 contained in the casing 18 and connects them via the connector 31 to the processor unit 20 on a printed circuit board in the machine, with the circuits specific to the machine.

FIG. 2 shows the aforementioned printhead 25 of the franking machine M, which is of the ink jet type, for example. There is also shown on its casing 36 a slot 37 in its front panel and below the head 25, into which a letter to be franked is inserted, together with a keypad 38 and a screen 39 on its top surface. The keypad 38 is used to enter into the postal charge calculator unit data concerning the destination country and the mailing method. The screen shows the amount of the postal charge for each letter inserted into the letter scale and then inserted under the printhead.

The letter scale module in accordance with the present invention has compact overall dimensions, is low in cost and is easy to connect to the franking machine, constituting a partially integrated module. It also makes it possible to integrate all the necessary processing electronics with those specific to the machine itself.

The present invention has been described with reference to the specific embodiment shown in the drawings. It is obvious that some parts could be replaced with equivalent parts without departing from the scope of the invention.

There is claimed:

1. Letter scale adapted to be connected to a postal charge calculator unit and a printhead of a franking machine, comprising a horizontal plate adapted to receive a letter to be weighed and to move vertically due to the weight of said letter, a coding arm mechanically coupled to said plate so as to move with it, coding elements on said arm, fixed sensing means facing towards said arm to sense said coding elements as they move relative to said sensing means due to movement of said arm, a processor unit connected to said sensing means and adapted to produce a measurement signal indicating one of a series of predetermined weight ranges within which the weight of the letter lies, a partly closed, flat, vertical casing housing at least said coding arm and said sensing means, and a vertical slot in an upper surface of said casing into which a letter is inserted to weigh it, said horizontal plate forming the bottom of said vertical slot, wherein said processor unit is outside said casing which has on a vertical surface parallel to said slot a connector for connecting said sensing means to said processor unit, and wherein said sensing elements comprise a series of regularly spaced apertures defining a bar code and said sensing means comprises two photoelectric sensors in quadrature facing said apertures and connected to said connector.

2. Letter scale according to claim 1 wherein said processor unit includes a circuit for distinguishing between the directions of relative movement of said coding elements and said sensing means, a circuit for counting up and down the number of coding elements sensed in respective directions of movement and a processor circuit adapted to integrate maximal up/down counting values to produce said measurement signal.

3. Franking machine adapted for use with a letter scale adapted to be connected to a postal charge calculator unit and a printhead of said franking machine and comprising a horizontal plate adapted to receive a letter to be weighed and to move vertically due to the weight of said letter, a coding arm mechanically coupled to said plate so as to move with it, coding elements on said arm, fixed sensing means facing towards said arm to sense said coding elements as they move relative to said sensing means due to movement of said arm, a processor unit connected to said sensing means and adapted to produce a measurement signal indicating one of a series of predetermined weight ranges within which the weight of the letter lies, a partly closed, flat, vertical casing housing at least said coding arm and said sensing means, and a vertical slot in an upper surface of said casing into which a letter is inserted to weight it, said horizontal plate forming the bottom of said vertical slot, said processor unit is outside said casing which has on a vertical surface parallel to said slot a connector for connecting said sensing means to said processor unit, said sensing elements comprise a series of regularly spaced apertures defining a bar code and said sensing means comprises two photo-electric sensors in quadrature facing said apertures and connected to said connector, said franking machine having on a vertical surface a connector complementary to said connector on said letter scale for direct connection of said letter scale to said franking machine, whereby said letter scale constitutes a module partially integrated into said franking machine.

4. Franking machine according to claim 1 wherein said processor unit incorporates said postal charge calculator unit and said franking machine includes a processor circuit board on which said processor unit is implemented.

* * * * *